(12) United States Patent
Yamane et al.

(10) Patent No.: US 12,128,667 B2
(45) Date of Patent: Oct. 29, 2024

(54) SKIN MATERIAL, METHOD FOR PRODUCING SAME, AND INTERIOR MATERIAL

(71) Applicant: TOYOTA BOSHOKU KABUSHIKI KAISHA, Aichi (JP)

(72) Inventors: Ryo Yamane, Aichi-ken (JP); Tsuyoshi Yamaguchi, Aichi-ken (JP); Yusuke Kawata, Kyoto-fu (JP); Yuji Kamide, Shiga-Ken (JP); Kazuhiro Masumoto, Shiga-Ken (JP); Takumi Tsukamoto, Shiga-Ken (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 59 days.

(21) Appl. No.: 17/924,075

(22) PCT Filed: Apr. 1, 2021

(86) PCT No.: PCT/JP2021/014247
§ 371 (c)(1),
(2) Date: Nov. 8, 2022

(87) PCT Pub. No.: WO2021/246040
PCT Pub. Date: Dec. 9, 2021

(65) Prior Publication Data
US 2023/0219322 A1 Jul. 13, 2023

(30) Foreign Application Priority Data
Jun. 3, 2020 (JP) ................................. 2020-097229

(51) Int. Cl.
*B32B 5/06* (2006.01)
*B32B 5/02* (2006.01)
(Continued)

(52) U.S. Cl.
CPC ................ *B32B 5/26* (2013.01); *B32B 5/026* (2013.01); *B32B 5/073* (2021.05); *B32B 7/12* (2013.01);
(Continued)

(58) Field of Classification Search
None
See application file for complete search history.

(56) References Cited

U.S. PATENT DOCUMENTS 11,060,240 B2 7/2021 Shinozaki
11,267,190 B2 3/2022 Yamane et al.
(Continued)

FOREIGN PATENT DOCUMENTS

JP 2005-023448 1/2005
JP 2008-196214 8/2008
(Continued)

OTHER PUBLICATIONS

Machine translation of JP2017213865 (Year: 2024).*
(Continued)

*Primary Examiner* — Alexander S Thomas
(74) *Attorney, Agent, or Firm* — GREENBLUM & BERNSTEIN, P.L.C.

(57) ABSTRACT

A skin material includes: a design layer; and a base cloth layer. The design layer includes a surface layer and a foam layer. The base cloth layer includes a surface fabric and a back fabric, and a binding yarn that binds the surface fabric and the back fabric. The binding yarn is a thermoplastic resin fiber erected between the surface fabric and the back fabric to form a gap between the surface fabric and the back fabric. The foam layer and the surface fabric are joined. An interior material includes the skin material and a base material to which the skin material is attached. A method for producing the skin material includes joining the surface layer and the
(Continued)

base cloth layer via a foamable adhesive to serve as the foam layer.

5 Claims, 2 Drawing Sheets

(51) Int. Cl.
 *B32B 5/26* (2006.01)
 *B32B 7/12* (2006.01)
 *B32B 37/12* (2006.01)
(52) U.S. Cl.
 CPC .......... *B32B 37/12* (2013.01); *B32B 2250/02* (2013.01); *B32B 2262/0276* (2013.01); *B32B 2266/0278* (2013.01); *B32B 2266/14* (2016.11); *B32B 2305/182* (2013.01)

(56) References Cited

U.S. PATENT DOCUMENTS

| | | |
|---|---|---|
| 2020/0039137 A1 | 2/2020 | Yamane et al. |
| 2020/0157736 A1 | 5/2020 | Shinozaki |
| 2020/0331252 A1 | 10/2020 | Yamane et al. |
| 2020/0398548 A1 | 12/2020 | Takahashi et al. |

FOREIGN PATENT DOCUMENTS

| | | |
|---|---|---|
| JP | 2017-213865 | 12/2017 |
| JP | 2019-072867 | 5/2019 |
| JP | 2019-107831 | 7/2019 |
| JP | 2020-020063 | 2/2020 |
| JP | 2020-050998 | 4/2020 |
| JP | 2020-084335 | 6/2020 |
| JP | 2020-176341 | 10/2020 |
| WO | 2019/004180 | 1/2019 |

OTHER PUBLICATIONS

China Office Action issued in CN Patent Appl. No. 202180030134.6, dated Mar. 30, 2024.
Japan Office Action issued in Japan Patent Appl. No. 2020-097229, dated Mar. 26, 2024.
Official Communication issued in International Patent Application No. PCT/JP2021/014247, dated Jun. 22, 2021, along with an English translation thereof.
Japan Office Action issued in Japanese Application No. 2020-097229, dated Oct. 31, 2023.

* cited by examiner

[FIG.1]
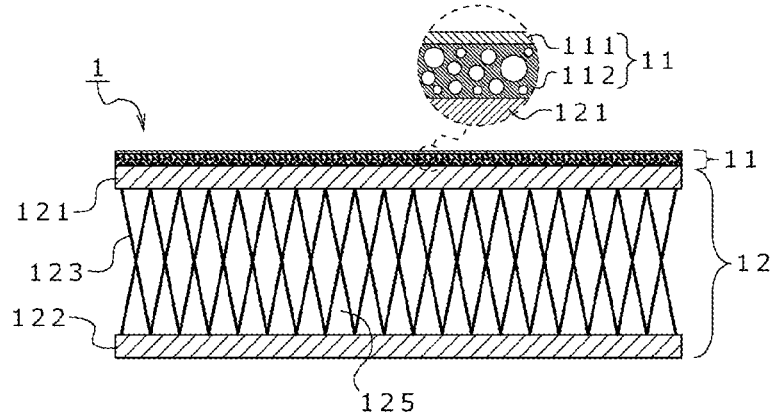
[FIG.2]
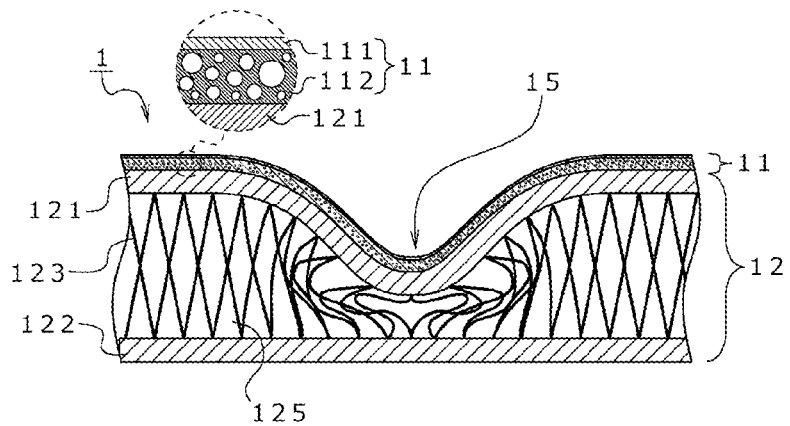
[FIG.3]
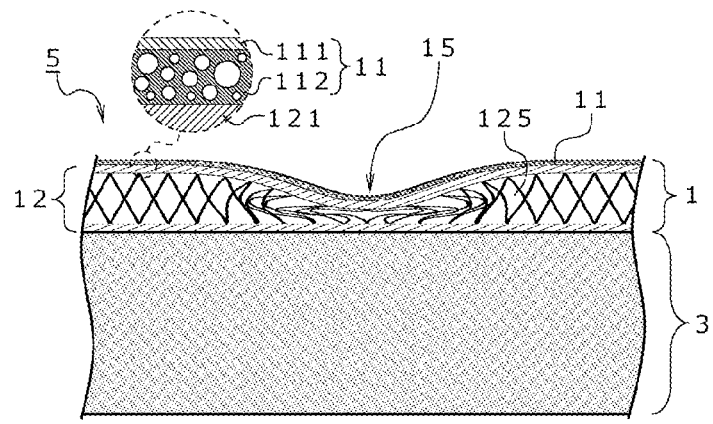

[FIG.4]
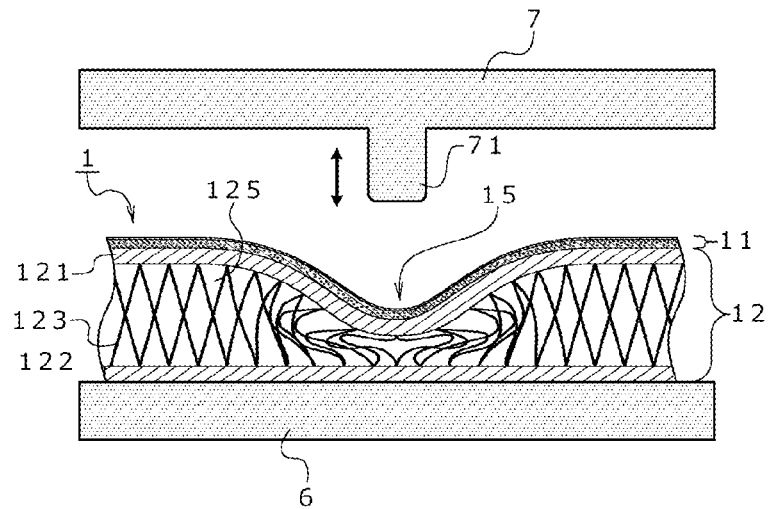
[FIG.5]
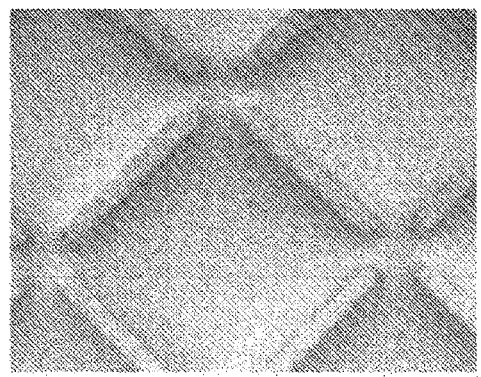
[FIG.6]
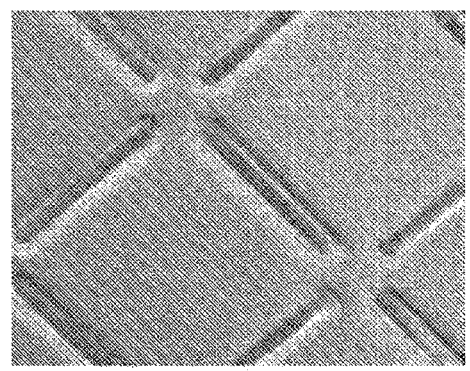

SKIN MATERIAL, METHOD FOR PRODUCING SAME, AND INTERIOR MATERIAL

TECHNICAL FIELD

The present invention relates to a skin material and a method for producing the same, as well as an interior material. More specifically, the present invention relates to a skin material including a base cloth layer having a gap between a surface fabric and a back fabric and a method for producing the same, as well as an interior material.

BACKGROUND ART

Conventionally, interior materials obtained by attaching a skin material for imparting a design to a base material are known. Among them, a skin material having a tactile design in addition to a visual design may be required. For example, a leather-like skin material having an embossed pattern corresponds to this skin material. The leather-like skin material having an embossed pattern is required to have a unique tactile sensation corresponding to leather in addition to a design on a surface thereof. As such a skin material, a technique of Patent Literature 1 is known.

CITATIONS LIST

Patent Literature

Patent Literature 1: JP 2017-213865 A

SUMMARY OF INVENTION

Technical Problems

Patent Literature 1 discloses a skin material including, as a base cloth layer, a three-dimensional knitted fabric in which two layers of front and back knitted fabric are bound by a binding yarn. In the base cloth layer, a concave thermally-deformed part is adjusted to a predetermined thickness by thermal deformation of a thermoplastic resin fiber as the binding yarn, so that an embossed pattern can be formed. As a result, it is possible to obtain a skin material having a three-dimensional design formed of a three-dimensional pattern having an excellent aesthetic appearance and having a very high degree of design freedom.

However, in industrial designs that continue to evolve day by day, there is an actual situation that more excellent designability is required one after another, and that further high designability and a degree of freedom thereof are required.

The present invention has been made in view of the above circumstances, and an object thereof is to provide a skin material that includes a base cloth layer having a structure in which a surface fabric and aback fabric are bound to each other while a gap is formed between the surface fabric and the back fabric, and that can exhibit a more excellent three-dimensional effect than conventional, and a method for producing the same, as well as an interior material.

Solutions to Problems

The present invention is as follows.
[1] A skin material of the present invention is a skin material including: a design layer and a base cloth layer, wherein the design layer includes a surface layer and a foam layer,
the base cloth layer includes a surface fabric and a back fabric, and a binding yarn that binds the surface fabric and the back fabric,
the binding yarn is a thermoplastic resin fiber erected between the surface fabric and the back fabric to form a gap between the surface fabric and the back fabric, and
the foam layer and the surface fabric are joined.
[2] In the skin material of the present invention, the foam layer can be thicker than the surface layer and thinner than the base cloth layer.
[3] In the skin material of the present invention, the foam layer can have a closed cell.
[4] The skin material of the present invention can have a three-dimensional design formed by narrowing the gap in a thickness direction.
[5] The interior material of the present invention includes the skin material of the present invention and a base material to which the skin material is attached.
[6] A method for producing the skin material of the present invention includes:
a joining step of joining the surface layer and the base cloth layer via a foamable adhesive to serve as the foam layer.

Advantageous Effects of Invention

The skin material of the present invention includes a base cloth layer having a structure in which a surface fabric and a back fabric are bound to each other while a gap is formed between the surface fabric and the back fabric, and can exhibit a more excellent three-dimensional effect than conventional.

The interior material of the present invention includes a skin material including a base cloth layer having a structure in which a surface fabric and a back fabric are bound to each other while a gap is formed between the surface fabric and the back fabric, and thus can have a more excellent three-dimensional design than conventional.

BRIEF DESCRIPTION OF DRAWINGS

The present invention will be further described in the following detailed description with reference to the following figures, given non-limiting examples of exemplary embodiments according to the present invention, and like reference symbols represent identical parts through several figures.

FIG. 1 is a schematic view for explaining a cross section of an example of a skin material of the present invention.

FIG. 2 is a schematic view for explaining a cross section of another example of the skin material of the present invention.

FIG. 3 is a schematic view for explaining a cross section of an example of an interior material of the present invention.

FIG. 4 is a schematic view for explaining a process of processing another example of the skin material of the present invention.

FIG. 5 is an enlarged view showing an appearance of a surface of a skin material according to an Example.

FIG. 6 is an enlarged view showing an appearance of a surface of a skin material according to a Comparative Example.

DESCRIPTION OF EMBODIMENTS

Hereinafter, the present invention will be described in detail with reference to the drawings.

The particulars described herein are given by way of example and for the purpose of illustrative discussion of the embodiments of the present invention, and are presented for the purpose of providing what is believed to be the description from which the principles and conceptual features of the present invention can be most effectively and readily understood. In this regard, no attempt is made to show structural details of the present invention in more detail than is necessary for the fundamental understanding of the present invention, and the description is taken with the drawings making apparent to those skilled in the art how several forms of the present invention may be embodied in practice.

[1] Skin Material

A skin material (1) of the present invention is a skin material including a design layer (11) and a base cloth layer (12), and the design layer (11) includes a surface layer (111) and a foam layer (112).

The base cloth layer (12) includes a surface fabric (121) and a back fabric (122), and a binding yarn (123) that binds the surface fabric (121) and the back fabric (122), and the binding yarn (123) is a thermoplastic resin fiber that is erected between the surface fabric (121) and the back fabric (122) to form a gap (125) between the surface fabric (121) and the back fabric (122).

Furthermore, the foam layer (112) and the surface fabric (121) are joined (see FIG. 1).

It is considered that, since the design layer 11 and the base cloth layer 12 are joined via the foam layer 112 in this manner, heat applied to the skin material 1 can be suppressed from staying in the design layer 11 or being accumulated in the design layer 11 when a three-dimensional design 15 (embossed pattern, stitch pattern, or the like) is formed by heat pressing. That is, it can be said that the presence of the foam layer 112 increases a thermal dispersion capacity as compared with an aspect in which the foam layer 112 is not present. Therefore, even if heat is sufficiently applied for forming the three-dimensional design, the binding yarn 123 can be more reliably thermally deformed, while damage to the design layer 11 is suppressed. That is, it is considered that damage to the design layer 11 can be prevented even if a higher temperature or a larger amount of heat is applied than conventional in order to thermally deform the binding yarn 123. Therefore, according to the present skin material 1, a more excellent three-dimensional effect can be exhibited than conventional.

Furthermore, in addition to the above-described effect of increasing the thermal dispersion capacity, an increase in rigidity of the entire design layer 11 is also considered to advantageously contribute to the exhibition of an excellent three-dimensional effect. This is considered to be because the entire rigidity of the skin material 1 is increased by providing the foam layer 112. That is, when the three-dimensional design 15 is applied to the skin layer having low rigidity, waviness may occur in the skin material. On the other hand, in the present skin material 1 having high rigidity, waviness does not occur even when a three-dimensional design is formed, and the three-dimensional design can have a firm and beautiful appearance. That is, it can be said that high rigidity can be obtained as a whole of the skin material 1 when a predetermined material is present in a foamed state as compared with when the predetermined material is present in a non-foamed state, as long as the predetermined material has the same basis weight, and, therefore, that an excellent three-dimensional effect can be exhibited.

In addition, the presence of the foam layer 112 increases a thickness of the entire design layer 11. That is, the thickness of the design layer 11 increases when the predetermined material is present in a foamed state as compared with when the predetermined material is present in a non-foamed state, as long as the predetermined material has the same basis weight. When the three-dimensional design 15 is applied, in particular, the design layer 11 around the three-dimensional design may be extended. However, even in such a case, the skin functions such as chemical resistance and friction durability can be maintained at high levels because the thickness is increased. Even when the design layer 11 around the three-dimensional design is extended, it is possible to prevent a concavoconvex shape of the base cloth layer 12 from affecting the design layer 11 at that place. That is, it is possible to prevent concaves and convexes of the surface fabric 121 of the base cloth layer 12 from being reflected on the design layer 11 and the concavoconvex shape from being recognized from the surface of the design layer 11.

The "design layer (11)" is a layer including the surface layer 111 and the foam layer 112. The surface layer 111 is a layer having a design surface in the skin material 1. That is, for example, when the skin material 1 is used as an interior material (an indoor interior material, a vehicle interior material, or the like), the surface layer 111 is a layer on a side exposed to the inside of a room or a vehicle.

The surface layer 111 is a layer that forms a design in the design layer 11, and any layer may be used. For example, a resin layer (polyurethane, polyvinyl chloride, polypropylene, or the like), a woven fabric (design woven fabric), synthetic leather, artificial leather, natural leather, or the like can be used. These may be used singly, or two or more thereof may be used in combination.

The surface layer 111 may be formed of a single layer or a plurality of layers. Examples of an aspect in which the surface layer is formed of a plurality of layers include an aspect in which a protective layer (topcoat layer) is provided as an outermost layer of the above-described resin layer, woven fabric, synthetic leather, artificial leather, natural leather, or the like. The protective layer can be provided as, for example, a transparent resin coating layer (polyurethane or the like).

Among the above-described ones, the surface layer 111 is preferably a polyurethane layer. The polyurethane layer may have any form, but is preferably a non-foamed polyurethane, and more preferably a polyurethane shaped into a film.

A urethane raw material constituting the surface layer 111 is not limited, and usually contains a polyol component and a polyisocyanate component.

Among them, the polyol component is exemplified as a compound having at least two hydroxyl groups in the molecule, and examples thereof include polycarbonate-based polyols, polyether-based polyols, polyester-based polyols, alkylene glycols, and polymer polyols using polyether-based polyols or polyester-based polyols. These may be used singly, or two or more thereof may be used in combination. Among them, a polycarbonate-based polyol is preferably contained, and examples of the polycarbonate-based polyol include polycarbonate diol.

Examples of the polyisocyanate component is exemplified as a compound having at least two isocyanate groups in the molecule, and examples thereof include aliphatic polyisocyanates, aromatic polyisocyanates, and modified compounds thereof. These may be used singly, or two or more thereof may be used in combination.

Examples of the aliphatic polyisocyanate include hexamethylene diisocyanate, isophorone diisocyanate, and dicyclohexamethylene diisocyanate. Examples of the aromatic polyisocyanate include toluene diisocyanate (TDI), diphenylmethane diisocyanate (MDI), naphthalene diisocyanate, xylylene diisocyanate, and polymeric polyisocyanate (crude MDI). Further, examples of the modified polyisocyanate compound include carbodiimide-modified compounds of aliphatic polyisocyanates or aromatic polyisocyanates.

A thickness of the surface layer 111 is not limited, but can be, for example, 5 mm or less. More specifically, the surface layer 111 can have a thickness of 5 µm or more and 1000 µm or less, and further can have a thickness of 20 µm or more and 150 µm or less.

Furthermore, for example, in a case where the protective layer described above is provided, the protective layer can occupy, for example, 0.1 µm or more and 20 µm or less, and can further occupy 1 µm or more and 10 µm or less, of the thickness described above.

The "foam layer (112)" is a resin layer containing bubbles formed by foaming. That is, cell walls separating the bubbles in the foam layer 112 from each other are formed of resin. The bubbles constituting the foam layer 112 may be open cells, but are preferably closed cells. In a case of closed cells, thermal dispersibility and heat insulating properties as the skin material 1 can be provided in a well-balanced manner. The type of resin constituting the foam layer 112 is not limited, and a polyurethane resin, a polyolefin resin, a polyvinyl chloride resin, a polystyrene resin, a polyamide resin, a urethane elastomer, a thermoplastic elastomer, or the like can be used. These may be used singly, or two or more thereof may be used in combination.

Among them, the resin type is preferably a polyurethane-based resin. That is, the foam layer 112 is preferably a foamed polyurethane layer. The foamed polyurethane layer may be a foamed polyurethane layer formed in any way. That is, examples of the foamed polyurethane layer include a laminated urethane layer formed by laminate molding, a slab urethane layer cut out from slab-molded foamed polyurethane, and a molded urethane layer cut out from molded foamed polyurethane. In addition, a foamed polyurethane layer formed by injection molding, a foamed polyurethane layer formed by spray foaming, a hot-melt urethane layer, or the like can also be used.

Among these, the foam layer 112 of the skin material 1 of the present invention is preferably a foamed polyurethane layer formed by laminate molding. That is, a foamed polyurethane layer formed by foaming a urethane adhesive is preferred.

For example, among the above, a slab urethane layer can also be suitably used. However, when the slab urethane layer is used, it is necessary to join the surface layer 111 and the slab urethane layer which is the foam layer 112 to each other via an adhesive or the like, and, further, to join the slab urethane layer which is the foam layer 112 and the surface fabric 121 of the base cloth layer 12 to each other via an adhesive or the like.

On the other hand, in a case of the laminated urethane layer, a foamed urethane raw material is applied between the surface layer 111 and the base cloth layer 12 (the surface fabric 121 of the base cloth layer 12) and reacted, so that the surface layer 111 and the base cloth layer 12 can be joined while the foam layer 112 is formed. That is, the design layer 11 and the base cloth layer 12 can be joined by the foamed urethane layer 112.

As described above, when the laminated urethane layer is used as the foam layer 112, it is not necessary to interpose another adhesive on front and back surfaces of the foam layer 112, thereby making it possible to prevent inhibition of flexibility by the adhesive. In addition, VOC problems when the material is used as an interior material can be prevented.

A method for forming the laminated urethane layer is not limited, and may be, for example, a one-component urethane adhesive or a two-component urethane adhesive, and these adhesives may be used alone or in combination.

The urethane raw material used is also not limited, and usually contains a polyol component and a polyisocyanate component.

Among them, the polyol component is exemplified as a compound having at least two hydroxyl groups in the molecule, and examples thereof include polycarbonate-based polyols, polyether-based polyols, polyester-based polyols, alkylene glycols, and polymer polyols using polyether-based polyols or polyester-based polyols. These may be used singly, or two or more thereof may be used in combination. Among them, a polycarbonate-based polyol is preferably contained. Examples of the polycarbonate-based polyol include polycarbonate diols.

Examples of the polyether-based polyol described above include polyether-based polyols in which an alkylene oxide is added to a polyhydric alcohol. Examples of the polyester-based polyol include a polyester polyol compound obtained by polycondensation of an aliphatic carboxylic acid and/or an aromatic carboxylic acid with a polyhydric alcohol. Further, examples of the alkylene glycol include polyhydric alcohols.

As for the polyisocyanate component, the description on the surface layer 111 given above can be applied as it is.

The above-described urethane raw material for forming the foam layer 112 may contain a foaming agent in addition to the polyol component and the polyisocyanate component. Examples of the foaming agent include water, hydrocarbons (pentane and the like), liquefied carbon dioxide gas, and alkylene chloride (methylene chloride, ethylene chloride and the like). These may be used singly, or two or more thereof may be used in combination.

In addition to the various components described above, various components such as a catalyst, a foam stabilizer, a crosslinking agent, an antioxidant, an ultraviolet absorber, a filler, an internal mold release agent, and a flame retardant can be blended in the urethane raw material described above. These other components may be used singly, or two or more thereof may be used in combination.

Examples of the catalyst include amines (amine compounds) and organometallic compounds. As the foam stabilizer, various surfactants can be used as appropriate.

The foam layer 112 of the skin material 1 of the present invention can be formed without using a foaming agent Specifically, it can be formed by incorporating air bubbles in the urethane raw material itself. For example, bubbles can be incorporated in the urethane raw material by foaming a mixed liquid at the time of mixing the polyol component and the polyisocyanate component. At this time, for example, a surfactant or the like can be utilized as necessary.

A thickness of the foam layer 112 is not limited, and can be, for example, 50 µm or more and 1000 µm or less. The foam layer 112 can further have a thickness of 80 µm or more and 500 µm or less, and can have a thickness of 100 µm or more and 300 µm or less.

The "base cloth layer (12)" is a layer including the surface fabric 121, the back fabric 122, and the binding yarn 123 binding the surface fabric 121 and the back fabric 122. The base cloth layer 12 is a composite layer including a layer including the surface fabric 121, a layer including the back fabric 122, and a layer including the binding yarn 123.

The surface fabric 121 and the back fabric 122 may be each independently a layer using a knitted item (double knitted fabric), a layer using a woven fabric, a layer using a nonwoven fabric, a layer using a resin film, or a layer other than these layers. Furthermore, the surface fabric and the back fabric may each be a layer including only one of these layers, or a composite layer using two or more thereof. When the surface fabric 121 and the back fabric 122 are layers using fibers, constituent yarns thereof may be thermoplastic resin fibers or fibers other than the thermoplastic resin fibers. These fibers may be used singly, or two or more thereof may be used in combination.

As the thermoplastic resin fibers, among those described above, polyester-based fibers, polyamide-based fibers, polyacrylic fibers, polyolefin-based fibers, and the like can be used. Among these, examples of the polyester-based fibers include polyethylene terephthalate fibers, polybutylene terephthalate fibers, and polytrimethylene terephthalate fibers. Furthermore, examples of the polyamide-based fiber include various nylon fibers (nylon 6 fibers, nylon 66 fibers, and the like). Further, examples of the polyacrylic fiber include various acrylic fibers containing polyacrylonitrile. Further, examples of the polyolefin-based fibers include polyethylene fibers and polypropylene fibers. Other examples include vinylon fibers and polyurethane fibers. These may be used singly, or two or more thereof may be used in combination. Among them, examples of fibers other than the thermoplastic resin fibers include natural fibers and regenerated fibers. Among them, examples of the natural fibers include cotton, hemp, silk, and wool. Examples of the regenerated fiber include cupra rayon, viscose rayon, and ryocell. These may be used singly, or two or more thereof may be used in combination.

The form of the constituent yarn is also not limited, and the constituent yarn may be either a filament yarn or a spun yarn. The filament yarn may be either a multifilament or a monofilament. Furthermore, the constituent yarn may be a non-bulky textured yarn or a bulky textured yarn (twisted yarn, false-twisted yarn, fluid jetted yarn, or the like).

Furthermore, a fineness of the constituent yarn is not limited, and can be, for example, 50 dtex or more and 1500 dtex or less, and, in particular, constituent yarns of 70 dtex or more and 1200 dtex or less, 150 dtex or more and 1200 dtex or less, 70 dtex or more and 500 dtex or less, 150 dtex or more and 500 dtex or less, and the like can be used. The finenesses of the constituent yarns of the surface fabric 121 and the back fabric 122 may be identical or different.

Among the various combinations described above, each of the surface fabric 121 and the back fabric 122 is preferably a layer using a knitted item (a knitted layer or a knitted fabric).

When both the surface fabric 121 and the back fabric 122 are knitted items, yarn densities thereof are not limited, but a yarn density in a course direction can be set to 10 yarns/inch or more and 100 yarns/inch or less, and is preferably set to 15 yarns/inch or more and 70 yarns/inch or less. A yarn density in a wale direction can be 5 yarns/inch or more and 50 yarns/inch or less. Further, the yarn density in the wale direction is preferably 15 yarns/inch or more and 50 yarns/inch or less, more preferably 8 yarns/inch or more and 40 yarns/inch or less, and particularly preferably 15 yarns/inch or more and 40 yarns/inch or less. The finenesses of the surface fabric 121 and the back fabric 122 may be identical or different.

The finenesses and the yarn densities described above allow for a reduction in number of stitches, and further, a reduction in size of stitches. Thus, a knitted fabric having few stitches can be obtained. Thus, when using a knitted fabric with few and small stitches as the surface fabric 121 and the back fabric 122, the binding yarn 123 can be suppressed from jumping out from the knitted fabric when the three-dimensional design 15 is formed.

The binding yarn 123 is a thermoplastic resin fiber that is erected between the surface fabric 121 and the back fabric 122 to form the gap 125 between the surface fabric 121 and the back fabric 122. The binding yarn 123 may bind the surface fabric 121 and the back fabric 122 in any manner, and, for example, can bind them by interlacing the surface fabric-side binding yarn woven into the surface fabric 121 and the back fabric-side binding yarn woven into the back fabric 122.

Also, the binding yarn 123 is thermally deformed at the time of heat pressing for providing the three-dimensional design 15 (embossed pattern or stitch pattern), so that it can have a function of narrowing the gap 125 formed between the surface fabric 121 and the back fabric 122 in the thickness direction and maintaining a thickness thereof.

As the binding yarn, the thermoplastic resin fibers such as polyester-based fibers, polyamide-based fibers, polyacrylic fibers, polyolefin-based fibers, and the like can be used. Among these, examples of the polyester-based fibers include polyethylene terephthalate fibers, polybutylene terephthalate fibers, and polytrimethylene terephthalate fibers. Furthermore, examples of the polyamide-based fiber include various nylon fibers (nylon 6 fibers, nylon 66 fibers, and the like). Further, examples of the polyacrylic fiber include various acrylic fibers containing polyacrylonitrile. Further, examples of the polyolefin-based fibers include polyethylene fibers and polypropylene fibers. These may be used singly, or two or more thereof may be used in combination. Among them, the base cloth layer 12 can include, in addition to the binding yarn 123, any other non-thermoplastic binding yarn that bind the surface fabric 121 and the back fabric 122 together as long as thermal deformation of the binding yarn 123 for forming the three-dimensional design 15 is not hindered. Specific examples of the yarn include fibers made of natural fibers such as cotton, hemp, silk, and wool. By incorporating such fibers in the binding yarn, softness can be imparted to the base cloth layer 12 while sufficient shape maintainability is obtained.

A form of the binding yarn is not limited, but a filament yarn is preferred. The filament yarn may be a multifilament or a monofilament, but a monofilament is more preferred. The monofilament can have rigidity as a yarn, and thus is preferred from the viewpoint of thickness retention property, cushioning property, shapability in the three-dimensional design 15, and the like. Furthermore, the binding yarn may be a non-bulky textured yarn or a bulky textured yarn (twisted yarn, false-twisted yarn, fluid jetted yarn, or the like).

Furthermore, the binding yarn 123 can utilize a yarn containing a low-melting-point material as a part thereof (hereinafter, also simply referred to as a "fusion yarn"). More specifically, a fusion yarn having a lower melting point than those of the constituent yarns of the surface fabric 121 and the back fabric 122 can be used. The fusion yarn may be a single yarn, or may be a yarn obtained by twisting a fusion yarn and a non-fusion yarn (yarn having a higher melting point than that of the fusion yarn) together, or may be a single monofilament yarn in which a fusion yarn and a non-fusion yarn are bonded together, or a yarn obtained by twisting the monofilament yarns together, or may be a single core-sheath monofilament yarn, or may be a yarn obtained by twisting the core-sheath monofilament yarns together. When this fusion yarn is used, thermal deformation can be made easier at the time of heat pressing for providing the three-dimensional design 15 (embossed pattern, stitch pattern, or the like).

A highly crimped yarn can be used as all or a part of the binding yarn 123. When the highly crimped yarn is used, more excellent cushioning property and shape retention property can be obtained.

A fineness of the binding yarn 123 is not limited, but can be 10 dtex or more and 1500 dtex or less. Furthermore, the fineness is preferably 20 dtex or more and 1000 dtex or less, and more preferably 20 dtex or more and 350 dtex or less.

Yarn densities of the binding yarn 123 are not limited, but a yarn density in the course direction can be set to 10 yarns/inch or more and 100 yarns/inch or less, and is preferably set to 15 yarns/inch or more and 70 yarns/inch or less. A yarn density in the wale direction can be set to 5 yarns/inch or more and 50 yarns/inch or less, and is preferably set to 8 yarns/inch or more and 30 yarns/inch or less.

When the base cloth layer 12 including the surface fabric 121, the back fabric 122, and the binding yarn 123 is a knitted item, a type of knit or structure thereof is not particularly limited, and may be, for example, warp knit or weft knit. More specific examples of the type of knit or structure of the knit fabric include double raschel knit, raschel knit, chain knit, inlay knit, denbigh knit (single tricot knit), cord knit, atlas knit (vandyke knit), double denbigh knit, half knit, satin knit, velvet knit, queens cord knit, rib knit, pearl knit (garter knit), plain knit (Jersey knit), interlock knit, fraise knit, Mockrody knit, ponte knit, three-hole ponte knit, milano rib knit, single pique knit, double pique knit, triple pique knit, cross miss knit, and brush interlock knit. These may be used singly, or two or more thereof may be used in combination.

Among them, a bulky knitted item (bulky knitted fabric) is preferred, and thus a three-dimensional knitted fabric, jersey, tricot, and the like are preferred. Among them, a three-dimensional knitted fabric is preferred, and double raschel knit is more preferred. These structures are preferably plain structures.

A thickness of the base cloth layer 12 (a normal thickness of a place where the three-dimensional design 15 is not formed) is not limited, but can be, for example, 1 mm or more and 20 mm or less. Further, the thickness is preferably 2 mm or more and 10 mm or less.

Further, a total thickness of the skin material 1 (a normal thickness of a place where the three-dimensional design 15 is not formed) is not limited, but can be, for example, 2 mm or more and 25 mm or less. Further, the thickness is preferably 3 mm or more and 10 mm or less.

As described above, the skin material 1 of the present invention is excellent in an aspect having the three-dimensional design 15 (see FIG. 2). That is, when the three-dimensional design 15 is provided, an excellent three-dimensional effect can be exhibited. Specifically, the surface layer 111 has the three-dimensional design 15. That is, it has the three-dimensional design 15 visually recognized from the surface layer 111. The three-dimensional design 15 can be formed by narrowing the gap 125 in the thickness direction by the binding yarn 123. That is, for example, the three-dimensional design 15 (embossed pattern, pseudo-stitch pattern formed by thermal deformation, and the like) can be formed by thermally deforming the binding yarn 123 to narrow the gap 125 in the thickness direction. In addition, the three-dimensional design 15 (stitch pattern) can be formed by narrowing the gap 125 in the thickness direction by a sewing yarn penetrating the front and back of the skin material 1. In the stitch pattern in this case, the binding yarn 123 is not thermally deformed. Furthermore, the three-dimensional design 15 formed by narrowing the gap 125 in the thickness direction is, in other words, concaves and convexes formed by drawing the design layer 11 to the gap between the surface fabric 121 and the back fabric 122 of the base cloth layer 12. That is, in the skin material 1 of the present invention, not only concaves and convexes are formed in a range of a thin thickness of the design layer 11 in a cross-sectional view, but also a dynamic design formed by drawing the design layer 11 to the gap between the surface fabric 121 and the back fabric 122 of the base cloth layer 12 can be obtained (see FIGS. 2).

In particular, among the above-described ones, in the three-dimensional design 15 formed by thermal deformation, a proportion at which the binding yarn 123 narrows the gap 125 in the thickness direction is not limited. However, when an average thickness at a place not subjected to three-dimensional shaping (embossing) is Do (mm) and a depth of a concave of the embossed pattern 15 is $D_{15}$ (mm), $D_0/D_{15} \geq 1.1$ is preferably satisfied, $1.1 \leq D_0/D_{15} \leq 8.0$ is more preferably satisfied, $1.2 \leq D_0/D_{15} \leq 6.0$ is more preferably satisfied, $1.4 \leq D_0/D_{15} \leq 5.0$ is more preferably satisfied, and $1.6 \leq D_0/D_{15} \leq 3.5$ is particularly preferably satisfied. In the embossed pattern 15 of such an aspect, the effect of the present invention can be more effectively obtained.

However, the concave shape is formed in the concave of the three-dimensional design (embossed pattern) by narrowing the gap 125 in the thickness direction by the thermally deformed binding yarn 123, and, usually, the thickness of the foam layer 112 is substantially the same as the thickness of the foam layer 112 in the region including no embossed pattern. In the embossed pattern 15 of such an aspect, the effect of the present invention can be more effectively obtained.

More specifically, when a thickness of the foam layer 112 in a portion not having the embossed pattern 15 (region subjected to heating and pressing) is $D_{112A}$, the thickness of the base cloth layer 12 is $D_{12A}$, a thickness of the foam layer 112 in a portion having the smallest thickness of the skin material 1 in the concave of the embossed pattern 15 is $D_{112B}$, and the thickness of the base cloth layer 12 is $D_{12B}$, $0 < D_{12B}/D_{12A} \leq 0.6$ and $0.8 \leq D_{112B}/D_{112A} \leq 1.2$ can be satisfied. This value can further be $0.3 \leq D_{12B}/D_{12A} \leq 0.5$ and $0.9 \leq D_{112B}/D_{112A} \leq 1.1$.

A specific shape (shape in plan view) of the three-dimensional design 15 (embossed pattern or the like) is not limited. That is, for example, it may be linear (linear or curved), may have a shape in which a predetermined region is widely recessed, or may be formed in such a manner that a pattern is drawn. The pattern is also not limited.

The skin material 1 of the present invention may include only the design layer 11 and the base cloth layer 12 described above, or can also include a layer other than the design layer 11 and the base cloth layer 12. Examples of the layer other than the design layer 11 and the base cloth layer 12 include a woven fabric layer and a resin sheet layer. These layers may be used singly, or two or more thereof may be used in combination. The woven fabric layer may have a printed pattern, a woven pattern, a color, and the like. Similarly, the resin sheet may have a printed pattern, a color, and the like.

[2] Interior Material

An interior material 5 of the present invention includes the skin material 1 and a base material 3 to which the skin material 1 is attached (see FIG. 3).

A shape of the base material 3 may be a solid body or a hollow body.

For example, the material constituting the base material 3 is not limited, and may be either an organic material or an inorganic material, or may be a composite material containing these materials. Examples of usable organic materials include a thermoplastic resin and a cured resin. Examples of usable inorganic materials include a metal, an alloy, and ceramics. In particular, the base material 3 can be a vehicle interior material.

A method for disposing the skin material 1 on the base material 3 is not particularly limited, and examples thereof include known methods such as bonding via an adhesive or the like and thermal fusion.

Other functional layers such as a sound absorbing layer and an elastic layer may be interposed between the skin material 1 and the base material 3.

The skin material 1 and the interior material 5 in the present invention can be used in various technical fields. Specifically, they can be suitably used in the field related to skin materials in various industries such as vehicles such as automobiles and railway vehicles (in particular, interior materials for vehicles), aircraft, ships, buildings, and apparel.

Specifically, they are useful in the technical field of skin materials for vehicle interior materials such as door trims, roof trims, and seats, skin materials for furniture such as sofas, and skin materials for daily necessities such as bags, wallets, and clothing.

[3] Method for Producing Skin Material

The method for producing the skin material of the present invention includes a joining step of joining the surface layer 111 and the base cloth layer 12 via a foamable adhesive to serve as the foam layer 112.

More specifically, the method for producing the skin material of the present invention can include a step of forming a foamed urethane layer (foam layer 112) by laminate molding.

In a case of the laminated urethane layer, a foamed urethane raw material is applied between the surface layer 111 and the base cloth layer 12 (the surface fabric 121 of the base cloth layer 12) and reacted, so that the surface layer 111 and the base cloth layer 12 can be joined while the foam layer 112 is formed. That is, the design layer 11 and the base cloth layer 12 can be joined by the foamed urethane layer 112.

As described above, when the laminated urethane layer is formed as the foam layer 112, it is not necessary to interpose another adhesive on front and back surfaces of the foam layer 112, thereby making it possible to prevent inhibition of flexibility by the adhesive. In addition, VOC problems when the material is used as an interior material can be prevented.

A method for forming the laminated urethane layer is not limited, and may be, for example, a one-component urethane adhesive or a two-component urethane adhesive, and these adhesives may be used alone or in combination.

Furthermore, the method can include a three-dimensional shaping step of forming the embossed pattern 15.

A heating temperature at the time of three-dimensional shaping is not limited, and is appropriately selected according to each material. For example, the heating temperature can be 100 to 200° C. (particularly 120 to 180° C.).

The heating time is not limited, and can be set to, for example, 0.1 to 600 seconds.

Furthermore, a cooling step of cooling the shaped place can be included, after performing the three-dimensional shaping. A cooling method used at this time is not particularly limited, and examples thereof include known methods. Note that natural cooling (allowing to cool) may be used.

Note that reference signs in parentheses attached to the respective components described in the above embodiments indicate correspondence relationships with specific components referred to in the Examples that will be described later.

EXAMPLES

Hereinafter, the present invention will be specifically described by way of examples.

[1] Preparation of Skin Material (Examples 1 and 2 and Comparative Example 1)

Example 1

The skin material 1 of Example 1 was prepared.

Skin material 1: the overall thickness is about 4 mm.

Design layer 11: formed of the surface layer 111 and the foam layer 112.

Surface layer 111: composed of a protective layer made of polyurethane and having a thickness of about 5 μm and a resin layer made of polyurethane and having a thickness of about 30 μm.

Foam layer 112: A foamed polyurethane layer foamed to a thickness of about 190 μm, and formed by foaming a polyurethane adhesive.

Base cloth layer 12: double raschel knitted fabric (thickness: about 3.5 mm)

More specifically, the knitted fabric is a knitted fabric having a structure in which the surface fabric 121 (constituent yarn; polyester-based resin fiber, thickness: about 0.6 mm) and the back fabric 122 (constituent yarn; polyester-based resin fiber, thickness: about 0.6 mm) are connected by the binding yarn 123 (polyester-based resin fiber, height: about 2.3 mm), wherein, in a course density of 45 yarns and a wale density of 30 yarns, the finenesses of the constituent yarns of the surface fabric and the back fabric are 84 dtex, and the fineness of the binding yarn 123 is 33 dtex.

The skin material of Example 1 was placed on a pedestal of a heating press machine, and heated and pressed from the design layer 11 side using a press die, under the conditions: a heating time: 20 sec., a cradle temperature: 200° C., and a press die temperature: 150° C. Next, the skin material 1 of Example 1 in which the embossed pattern 15 formed in a concave shape was formed was obtained by natural cooling and demolding (see FIG. 4). The appearance of its surface is shown in FIG. 5.

In the skin material 1 of Example 1, the foam layer 112 is a layer thicker than the surface layer 111, and a ratio of the thickness $D_{112}$ (μm) of the foam layer 112 to the thickness $D_{111}$ (μm) of the surface layer 111 is $D_{112}/D_{111}=5.4$. Furthermore, the foam layer 112 is a layer thinner than the base cloth layer 12, and a ratio of the thickness $D_{112}$ (μm) of the foam layer 112 to the thickness $D_{12}$ (μm) of the base cloth layer 12 is $D_{12}/D_{112}=184$.

Comparative Example 1

A skin material 9 of Comparative Example 1 was prepared.

The skin material 9 was obtained in the same manner as in Example 1, except that the foam layer 112 in the skin material 1 of Example 1 was not foamed, and that a non-foamed polyurethane layer having a thickness of 35 μm was used.

Thereafter, an embossed pattern was formed in the same manner as in Example 1 to obtain the skin material 9 of Comparative Example 1. The appearance of its surface is shown in FIG. 6.

The present invention is not limited to the embodiments described in detail above, and various modifications or changes can be made within the scope of the claims of the present application.

INDUSTRIAL APPLICABILITY

The skin material and the structure of the present invention can be used in various technical fields. Specifically, the present invention can be suitably used in the field related to skin materials in various industries such as vehicles (e.g., automobiles and railway vehicles), aircraft, ships, buildings, and apparel.

REFERENCE SIGNS LIST

1; Skin material
11; Design layer
111; Surface layer
112; Foam layer
12; Base cloth layer
121; Surface fabric
122; Back fabric
123; Binding yarn
125; Gap
15; Embossed pattern
3; Base material
5; Interior material.

The invention claimed is:

1. A skin material comprising: a design layer and a base cloth layer,
wherein the design layer includes a surface layer and a foam layer,
the base cloth layer includes a surface fabric and a back fabric, and a binding yarn that binds the surface fabric and the back fabric,
the binding yarn is a thermoplastic resin fiber erected between the surface fabric and the back fabric to form a gap between the surface fabric and the back fabric,
the foam layer and the surface fabric are joined, and
a three-dimensional design formed by narrowing the gap in a thickness direction to define an embossed pattern, wherein
a thickness of the foam layer at a place not subjected to an embossing is substantially the same as a thickness of the foam layer at an embossed place.

2. The skin material according to claim 1, wherein the foam layer is thicker than the surface layer and thinner than the base cloth layer.

3. The skin material according to claim 1, wherein the foam layer has a closed cell.

4. An interior material comprising:
the skin material according to claim 1; and
a base material to which the skin material is attached.

5. A method for producing the skin material according to claim 1, the method comprising:
joining the surface layer and the base cloth layer via a foamable adhesive to serve as the foam layer.

* * * * *